(12) United States Patent    (10) Patent No.:     US 8,613,005 B2
Larson et al.                (45) Date of Patent:    Dec. 17, 2013

(54) SYSTEMS AND METHODS FOR PROVIDING A SERVICE-ORIENTED USER INTERFACE INTEGRATION BUS

(75) Inventors: Ronald Larson, Palm Bay, FL (US); Augusto Sellhorn, Melbourne, FL (US)

(73) Assignee: General Electric Company, Schenectady, NY (US)

( * ) Notice: Subject to any disclaimer, the term of this patent is extended or adjusted under 35 U.S.C. 154(b) by 549 days.

(21) Appl. No.: 12/570,445

(22) Filed: Sep. 30, 2009

(65) Prior Publication Data

US 2011/0078707 A1    Mar. 31, 2011

(51) Int. Cl.
*G06F 9/46* (2006.01)
(52) U.S. Cl.
USPC .......................................... 719/329; 719/315
(58) Field of Classification Search
None
See application file for complete search history.

(56) References Cited

U.S. PATENT DOCUMENTS

| 5,978,834 | A  | * | 11/1999 | Simonoff et al. | ............. | 709/203 |
| 6,862,648 | B2 | * | 3/2005  | Yatziv          | ............. | 710/315 |
| 7,546,602 | B2 | * | 6/2009  | Hejlsberg et al.| ............. | 719/313 |
| 2006/0265711 | A1 | | 11/2006 | Bantz et al.    |              |          |
| 2008/0082987 | A1 | * | 4/2008 | Mao et al.      | ............. | 719/313 |
| 2008/0196043 | A1 |   | 8/2008 | Feinleib et al. |              |          |

OTHER PUBLICATIONS

Disclosure Statement Under 37 C.F.R. §1.56 as filed Sep. 30, 2009.
The EP Search Report issued in connection with the corresponding EP Application No. 10183815.9 on Mar. 28, 2011.

* cited by examiner

*Primary Examiner* — Camquy Truong
(74) *Attorney, Agent, or Firm* — Sutherland Asbill & Brennan LLP (57) ABSTRACT

Embodiments of the invention can provide systems and methods for providing a service-oriented user interface integration bus. According to one embodiment, a system can be provided having a memory for storing computer executable instructions and a processor in communication with the memory via a computer interface. The processor can be adapted to execute computer executable instructions and configured to receive a user interface service request from an application module associated with a first platform. The processor can also be adapted to transform the user interface service request from the application module to a user interface service request for a host platform. The processor can also be adapted to match the transformed user interface service request to a platform service to provide a visual interface with the application module to a user on the host platform.

20 Claims, 5 Drawing Sheets

SYSTEMS AND METHODS FOR PROVIDING A SERVICE-ORIENTED USER INTERFACE INTEGRATION BUS

FIELD OF THE INVENTION

The invention relates generally to user interfaces, and more particularly, to systems and methods for providing a service-oriented user interface integration bus.

BACKGROUND OF THE INVENTION

Conventional user interface ("UI") integration technologies allow a user to collaborate and interact with one or more computer applications. Examples of conventional UI integration technologies include ActiveX, for use with Microsoft Windows, and Open Services Gateway Initiative ("OSGi"), for use with platforms like the Eclipse application framework. While these conventional UI integration technologies serve their intended purpose of allowing a user to interface with a particular component, they are technology dependent. For example, OSGi is language dependent, being written in Java code. ActiveX, meanwhile, is limited to Microsoft-based platforms. Consequently, because conventional UI integration technologies are not technology neutral, conventional UI integration technologies have limited interoperability and may require substantial redesign before they can be transferred between technologies.

In addition, conventional UI integration technologies have been directed to component integration rather than application integration. As initiatives emerge to integrate disparate systems for increased efficiencies, conventional UI integration technologies are having to be redesigned to allow users to interface with applications from these systems using a common platform. An example of such an initiative is the Smart Grid. The Smart Grid aims to integrate a new set of applications with legacy power grid systems for real time monitoring and control though a common platform. By enabling a common platform to make energy allocation decisions in place of multiple decision-makers at a more local level, the Smart Grid aims to increase efficiencies associated with the utility power grid. These increased efficiencies, however, require a user at the common platform to interact with various applications provided by legacy systems, and thus requires disparate applications to be integrated through the common platform. Conventional UI integration technologies are not adapted for application integration and therefore do not allow interaction by a user at a common platform.

Therefore, a need exists to enable users to interface, in a technologically neutral way, with various applications from disparate technologies using a common platform. More specifically, there is a need for systems and methods for providing a service-oriented user interface integration bus.

BRIEF DESCRIPTION OF THE INVENTION

Embodiments of the invention can address some or all of the needs described above. Certain embodiments of the invention are directed generally to systems and methods for providing a service-oriented user interface integration bus. According to one embodiment, a method for providing a service-oriented user interface integration bus on a host platform can be provided. The method can include receiving a user interface service request from an application module. The application module can be associated with a first platform that is either common or different from the host platform. The method can also include transforming the user interface service request from the application module into a user interface service request for the host platform. The method can further include matching the transformed user interface service request with one or more platform services to provide a visual interface with the application module to the user through the host platform.

According to another embodiment, a system for providing a service-oriented user interface integration bus can be provided. The system can include a memory for storing computer executable instructions and a processor in communication with the memory via a computer interface. The processor can be configured through computer-executable instructions to receive a user interface service request from an application module associated with a first platform. The processor can also be adapted to transform the user interface service request from the application module to a user interface service request for a host platform. The processor can also be adapted to match the transformed user interface service request to a platform service to provide a visual interface with the application module to a user on the host platform.

According to yet another embodiment of the invention, a computer program embodied on a computer-readable medium for providing a service-oriented user interface integration bus on a host platform can be provided. The computer program can include instructions for adapting a processor to receive a user interface service request from an application module. The computer program can also include instructions for adapting the processor to transform the user interface service request from the application module into a user interface service request for the host platform. The computer program can further include instructions for adapting the processor to match the transformed user interface service request with one or more platform services to provide a visual interface with the application module to the user through the host platform.

Other embodiments and aspects of the invention will become apparent from the following description taken in conjunction with the following drawings.

BRIEF DESCRIPTION OF DRAWINGS

Having thus described the invention in general terms, reference will now be made to the accompanying drawings, which are not necessarily drawn to scale, and wherein:

DETAILED DESCRIPTION OF THE INVENTION

The invention now will be described more fully hereinafter with reference to the accompanying drawings, in which example embodiments of the invention are shown. This invention may, however, be embodied in many different forms and should not be construed as limited to the example embodiments set forth herein; rather, these embodiments are provided so that this disclosure will convey the scope of the invention to those skilled in the art. Like numbers refer to like elements throughout.

Certain embodiments of the invention can integrate user-interface ("UI") applications from disparate technologies into a single, service oriented UI. In so doing, certain embodiments of the invention can provide a common platform for system developers to leverage existing applications or to provide new applications for a range of existing or developing technologies and/or systems. In other words, certain embodiments of the invention can provide interoperability to disparate technologies whether such technologies were designed by different teams or acquired for different purposes such that they can be operated from a single, well-defined, and integrated runtime environment. For example, certain embodiments of the invention can be an enabling technology for Smart Grid, which leverages systems that enable a user to control and monitor an entire distribution network, often employing a wide range of dissimilar systems, from one consolidated graphical user interface. Hence, interoperability is at least one technical effect of certain embodiments of the invention.

In addition, certain embodiments of the invention can reduce redesign and increase efficiencies associated with systems integration. In certain embodiments, the access to applications in legacy systems can be provided, thus reducing the need to re-implement legacy applications in modern designs. In other embodiments, capabilities of legacy applications can be extended by enabling the implementation of more advanced UI applications that can leverage these legacy systems. Thus, in providing an interoperable interface to legacy applications, the need to re-implement already existing functionality is reduced. From a cost perspective, by enabling access to an existing application rather than re-implementing the existing application as a new application for a new system, certain embodiments of the invention can provide cost reductions associated with legacy systems integration. Therefore, systems integration at a reduced cost is at least one other technical effect of certain embodiments of the invention.

Figure 1:
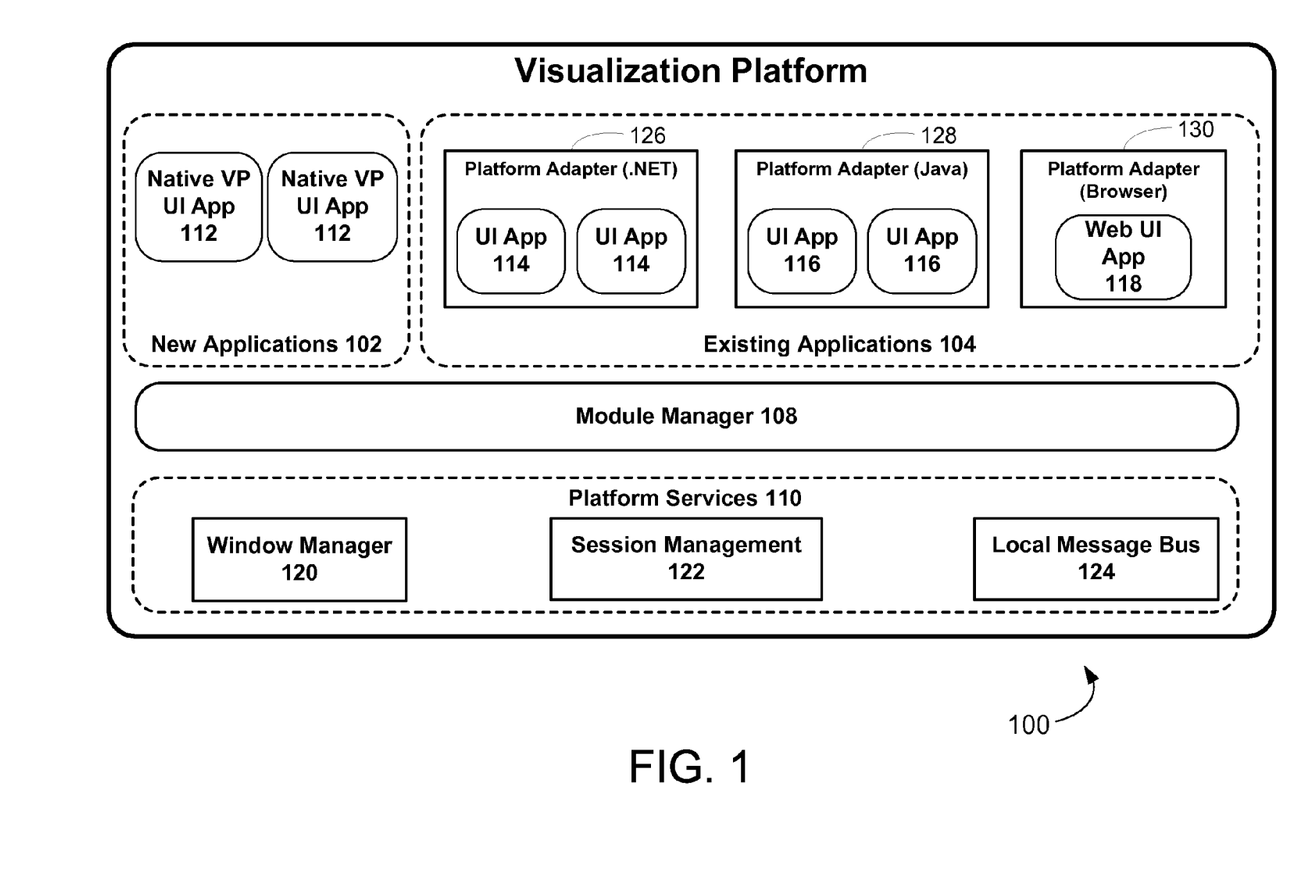
FIG. 1 illustrates an example system for providing a service-oriented user interface integration bus according to one embodiment of the invention.

FIG. 1 illustrates an example system 100 for providing a service-oriented user interface integration bus according to one embodiment of the invention. It will be appreciated that while system 100 is shown in and described with respect to FIG. 1, system 100 is provided by way of example only. Numerous other system operating environments, architectures, and/or configurations are possible. Accordingly, embodiments of the invention should not be construed as being limited to any particular operating environment, architecture, or configuration shown in and described with respect to FIG. 1.

In general, system 100 can be described as a visualization platform 100. Visualization platforms can be used to provide users a data exploitation environment for the visualization of data, for the manipulation of data, and for interaction with data. When compared to conventional technologies, though, visualization platform 100 includes novel features that can enable existing, legacy UI application modules, which may be implemented on disparate application frameworks, and new UI application modules, which may or may not be implemented on the application framework of a host platform, to run and communicate in one or more UI runtime environments on the host platform. In the example embodiment, this functionality can be provided through the example high level architecture shown.

As part of this high level architecture, a service-oriented user interface integration bus can be provided. In the example embodiment, the visualization platform 100 can include one or more UI application modules adapted to interface with module manager 108. In one embodiment, visualization platform 100 can include new application modules 102, which can correspond to one or more UI application modules that may be adapted for operation within a host platform or within a first platform. In another embodiment, visualization platform 100 can include existing application modules 104, which may correspond to one or more UI application modules also adapted for operation within the first platform. In one embodiment, the first platform can share a common application framework with the host platform. In other embodiments, the first platform and the host platform can accommodate disparate application frameworks.

In the example embodiment, UI application modules like new application modules 102 and existing application modules 104 can describe the UI services they can provide and the UI services they can consume to module manager 108. UI services describe the services utilized by a UI application module so that one or more displays can be provided to a user. In one embodiment, such as when the UI application module and the host platform share a common application framework, module manager 108 can match one or more UI services available from the host platform with one or more UI application modules after having received a UI service request from the one or more UI application modules. In another embodiment, such as when the UI application module and the host platform do not share a common application framework, module manager 108 can transform the UI service requests from the UI application module into a UI service request for the host platform. Having determined a UI service request for the host platform, module manager 108 can match the transformed UI service request with a UI service available from the host platform.

In providing a UI integration bus, module manager 108 can facilitate communication between existing UI application modules 104 and new UI application modules 102 with UI services available from the host platform, such as platform services 110. Once matching UI services with one or more application modules, module manager 108 can interface with platform services 110 to provide a visual interface to a user on the host platform. In at least this way, by matching UI services available from the host platform with the UI service requested by these disparate application modules to provide a common interface to a user, visualization platform 100 can be service-oriented.

Figure 2:
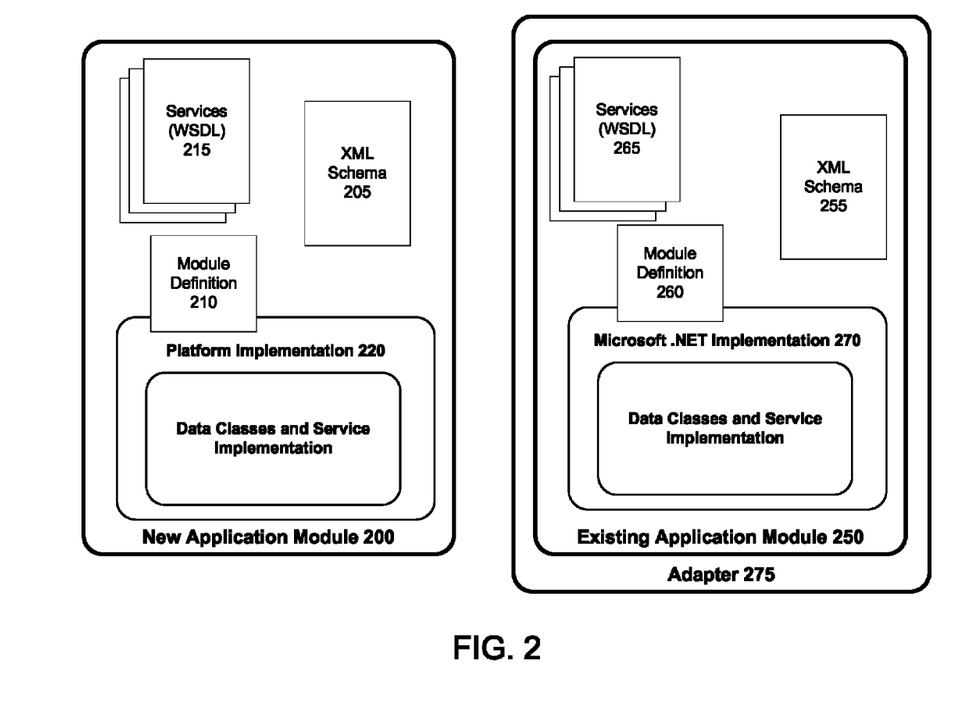
FIG. 2 illustrates example application modules as a part of a service-oriented user interface integration bus according to one embodiment of the invention.

FIG. 2 illustrates UI application module 200—which can represent an embodiment of new application module 102 like native visualization platform application module 112—and UI application module 250—which can represent an embodiment of existing application module 104 like UI application module 114. In one embodiment, UI application module 200 can be declarative or exhibit declarative features, meaning that UI application module 200 can include technologically independent features. In another embodiment, UI application module 200 can be technology dependent and can be associated with one or more application frameworks.

UI application module 200 can include four components: (1) an extensible markup language ("XML") based schema library 205; (2) a module definition library 210; (3) a services module 215; and (4) a platform implementation module 220. XML schema library 205 can define one or more objects for UI application module 200. Module definition library 210 can contain one or more defining characteristics of the UI application module 200, such as the module name, module version information, module dependencies, and/or information associated with implementation of UI application module 200 on a host platform. Services module 215 can define local services for implementing one or more XML objects of XML schema 205 of UI application module 200 on a host platform.

Platform implementation module 220 can provide the UI services requested by the services module 215 according to the application framework of the host platform. That is, in the example embodiment, platform implementation module 220 can implement the XML schema 205 according to the local services 215 of UI application module 200 on the host platform. To illustrate, one or more data objects defined in XML schema 205 could require one or more services 215 for implementation in a UI. To this end, platform implementation module 220 can implement the services 215 on the host platform for the one or more data objects defined in XML schema 205.

It will be appreciated that, while in the example embodiment new application modules 102 and 200 can be integrated and/or designed to operate on the application framework existing on the host platform, new application modules 102 and 200 can also be associated with an application framework that may exist for other platforms. That is, in some embodiments, platform implementation module 220 can be associated with an application framework that differs from the host platform. In such embodiments, when the platform implementation module 220 is associated with an application framework that differs from the host platform, one or more adapters may be further employed in combination with UI application module 200 to provide technological neutrality and/or independence. An example adapter is described below in relation to existing application module 250.

It will also be appreciated that, because in some embodiments, new application modules 102 and 200 can exhibit technologically independent features, these features can be associated with any one or more of the modules or libraries described above. That is, in embodiments where UI application module 102 and UI application module 200 can be declarative, one or more of XML schema 205, module definition library 210, and services module 215, can exhibit technological independent features, such as through one or more programming languages. In the example embodiment, UI application module 102 and UI application module 200 can define UI services using a variation of web services description language ("WSDL"), except that rather than define web services, UI application module 102 and UI application module 200 can request UI local services from module manager 108 through platform implementation module 220 to provide a common UI though the host platform. More specifically, as a declarative module, services module 215 can request UI local services expressively, meaning that services module 215 can describe the services required of one or more XML objects 205 without regard to implementation on the host platform. Platform implementation 220, after receiving the expressive calls for services defined according to services definition library 215, can then be associated with implementing these services on the host platform.

With continued reference to FIG. 1 and FIG. 2, existing application module 250 can correspond to an existing application module 104, like UI application module 114, which can be adapted for operation on an application framework different from the host platform, such as the Microsoft .NET application framework as in the example embodiment. In the example embodiment, existing UI application module 250 is shown as comprising one or more components that may be declarative, including XML schema 255, module definition library 260, and services definition library 265. It will be appreciated that while the example embodiment presents existing application module 250 as having declarative aspects, other embodiments of the invention can be associated with existing application modules having fewer, more, or no declarative aspects.

In addition to declarative modules, existing application module 250 can include an implementation module for implementation of the existing application module 250 on a platform that may differ from the host platform. In the example embodiment, the implementation module is presented as a Microsoft .NET implementation module 270 for implementing the existing application module 250 in a Microsoft .NET application framework. An implementation module like Microsoft .NET implementation module 270 can provide the UI services requested by the services module 260 according to the existing application framework for one or more host platforms. Because existing application module 250 is configured to operate on a single application framework, existing application module 250 is not technology neutral. In other words, in conventional systems, a user can not interact with existing application module 250 from a platform having an application framework that differs from the application framework provided by implementation module 270. Certain embodiments of the invention, however, can provide technological neutrality, such as through one or more platform adapters 275 shown in FIG. 2 and platform adapters 126, 128, and 130 shown in FIG. 1.

Platform adapter 275 presents an example embodiment of an adapter for implementing existing application module 250 on a host platform when the existing application module 250 is associated with an application framework that differs from the host platform. Platform adapter 275 provides a bridge between the implementation module 270 of the existing application module 250 and the application framework implemented on the host platform through the module manager 108.

For example, platform adapters 126 and 128 can allow module manager 108 to host application modules written in languages associated with multiple application frameworks, such as Microsoft .NET and Java application frameworks as shown in the example embodiment. Adapters like web application adapter 130 can allow module manager 108 to integrate application modules from additional application frameworks and/or platforms, such as a browser application module and a thick client. In both instances, module manager 108 can provide a single user interface as a part of visualization platform 100 that provides technological neutrality.

To illustrate with reference to visualization platform 100, at block 104 are provided existing application modules encompassed within one or more platform adapters. By bridging the implementation features of existing application modules 104 with implementation features of the host platform through module manager 108, adapters 126, 128, and 130 can allow visualization platform 100 to leverage existing application modules 104 while also leveraging new application modules 102 without requiring modifications to existing application modules 104. Such leverage can be associated with improving interoperability. In the example embodiment, existing application modules 104 can include any one or more of the following platform adapters: (1) platform adapter 126 can be associated with adapting Microsoft.NET application modules for integration with visualization platform 100; (2) platform adapter 128 can be associated with adapting Java application modules for integration with visualization platform 100; and (3) platform adapter 130 can be associated with adapting web-based and/or internet browser application modules for integration with visualization platform 100.

Platform adapters 126, 128, and 130 can integrate existing application modules 104 with visualization platform 100 without modifying the functionality of existing applications 104, even though these application modules may be designed and configured to run on multiple application frameworks associated with multiple platforms. To accomplish this end, platform adapters 126, 128, and 130 can bridge the UI services requested by an existing application module 104 to one or more UI services provided through visualization platform 100 through module manager 108. For instance, in one embodiment, module manager 108 can match one or more platform services 110 for the user interface provided by visualization platform 100 with one or more UI service requests from one or more application modules 114, 116, and 118 as provided to module manager 108 through one or more platform adapters 126, 128, and 130.

For example, if an existing application 114 has a well defined windowing system, then application adapters such a Microsoft .NET adapter 126 can transform UI service requests from existing application module 114 into an UI service request that corresponds to one or more windowing system application programming interfaces ("APIs"). Module manager 108 can also map the transformed UI service requests provided by Microsoft .NET platform adapter 126 to one or more host platform services 110 provided by visualization platform 100 as more fully described below. In this way, existing application 114 can be integrated with visualization platform 100 without the core functionality of application module 114 being disturbed.

In addition to providing one or more UI services available from the host platform to existing application modules 104, module manager 108 can provide interoperability between one or more existing application modules 104, such as between application module 116—which can be configured for a Java application framework—and application module 114—which can be configured for a Microsoft .NET application framework.

Figure 3:
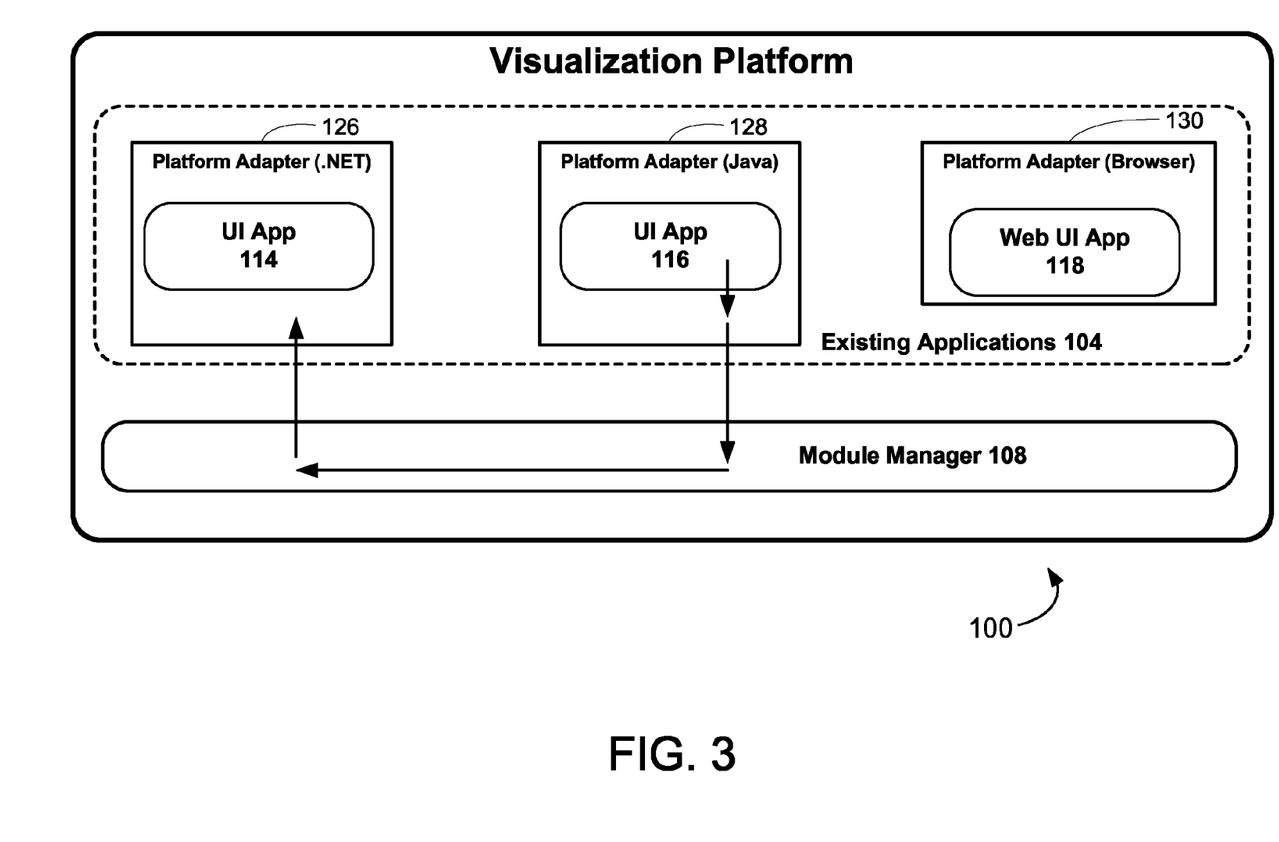
FIG. 3 illustrates an example system and method for providing a service-oriented user interface integration bus according to one embodiment of the invention.

To illustrate with reference to FIG. 3, existing application module 116 can request a UI service from a legacy Java application framework. Platform adapter 128 can transform the UI service request from application module 116 into a UI service request for the host platform, which in the example embodiment, is shown as an XML-based UI service request. The XML-based UI service request can be provided to module manager 108. Module manager 108 can match the XML-based service request to one or more UI services of the host platform and then invoke the UI service request in application module 114 through platform adapter 126. Platform adapter 126 can be configured to transform the UI service request from module manager 108, which corresponds to a UI service of the host platform, into a UI service request for existing module 114, which is configured for the Microsoft .NET application framework, such as by using a Java Native Interface in one embodiment. When existing application module 104 corresponds to a web-based and/or internet browser application module, a Java Native Interface can also be used to transform and map the UI service request from the web application module 118 to a UI service available through module manager 108. In at least these ways, visualization platform 100 can provide interoperability between one or more existing application modules 104.

In the example embodiment, module manager 108 is associated with providing interoperability between one or more application modules 102 and 104 and with implementing the application modules 102 and 104 on the host platform. Implementation of an application module can be done either directly, such as through the implementation module of the new application module 102, or indirectly, such as through the platform adapters 126, 128, and 130. When implementing an application module directly, which can occur when the application module 102 includes an implementation module that corresponds to the application framework of the host platform, module manager 108 can pass UI service requests from the application module to the platform services module 110 of the host platform. When implementing an application module indirectly, which can occur when an existing application module 104 includes an implementation module that does not correspond to the application framework of the host platform, module manager 108 can identify the appropriate adapter and load the appropriate adapter with reference to the existing application module 104.

It will be appreciated that to interact with one or more suitable platform adapters and to provide the functionality described above, module manager 108 can be implemented and appropriately configured in any suitable programming language. For example, in one embodiment, module manager 108 can be implemented in Java. To interact with existing application module 114 in visualization platform 100, which is shown as being configured for a Microsoft .NET platform, a Microsoft .NET adapter 126 can be provided to bridge module manager 108 to existing application module 114. In one embodiment, Microsoft .NET adapter 126 can correspond to a Java Native Interface-based adapter for allowing the application module 114 to interact with the Java encoded module manager 108. A Java Native Interface-based adapter can also correspond to platform adapter 130. In this way, platform adapter 130 can transform the UI service requests from web application module 118 into a Java API for module manager 108.

Referring again to FIG. 1, at block 110 can be provided one or more platform services for platform support. Unlike conventional UI technologies that have been directed to component integration, visualization platform 100 can include a set of platform services that can be directed to solve issues related to UI application integration. That is, visualization platform 100 can provide one or more services to support UI integration with module manager 108.

These services can include, for example, windowing services provided by window manager 120. Window manager 120 can manage windows displayed to a user on the host platform and to provide the user an ability to modify the operation of one or more application modules, such as through the platform adapters described above. Window manager 120 can also allow a user to create window objects and to direct data between one or more application modules through module manager 108. In providing windowing services, window manager 120 can manage the integration of visualization platform 100 with a windows-based operating environment, or with other operating environments known within the art.

Platform services 110 can also include session management services provided by session management module 122. Session management module 122 can manage the system resources of the host platform to accommodate the UI service requests from the various application modules described above to provide reliable operation of the host platform. Session management module 122 can also allow one or more application modules to share session information as well as provide user services such as those associated with login, logoff, and user messages.

Platform services 110 can further include local bus manager 124 for managing messages between one or more application modules through module manager 108. It will be appreciated that while platform service 110 are described in relation to the services described above, the particular services described are presented for example purposes only and are intended to convey a potential set of services to support UI integration with module manager 108. Accordingly, embodiments of the invention should not be construed as being limited to the particular platform services 110 described.

It will also be appreciated that while the high level architecture described in relation to FIG. 1 includes one or more adapters and methods for providing UI services in a technologically neutral way, additional architectures can be employed according to other embodiments of the invention. For example, disparate technologies can be integrated manually and in a point to point manner rather than through one or more of the adapters described. Therefore, it will be appreciated that other embodiments of the invention can exist in addition to the high level architecture shown and described with relation to FIG. 1.

Other embodiments of the invention, for example, can be embedded in a legacy platform rather than implemented on a new host platform. That is, in some embodiments, visualization platform 100 can be embedded in a legacy system, which can allow application modules designed for the service-oriented user integration bus of FIG. 1 to operate on the legacy system, thereby extending the functionality and utility of the legacy system without redesigning and re-implementing these application modules in the legacy system.

Figure 4:
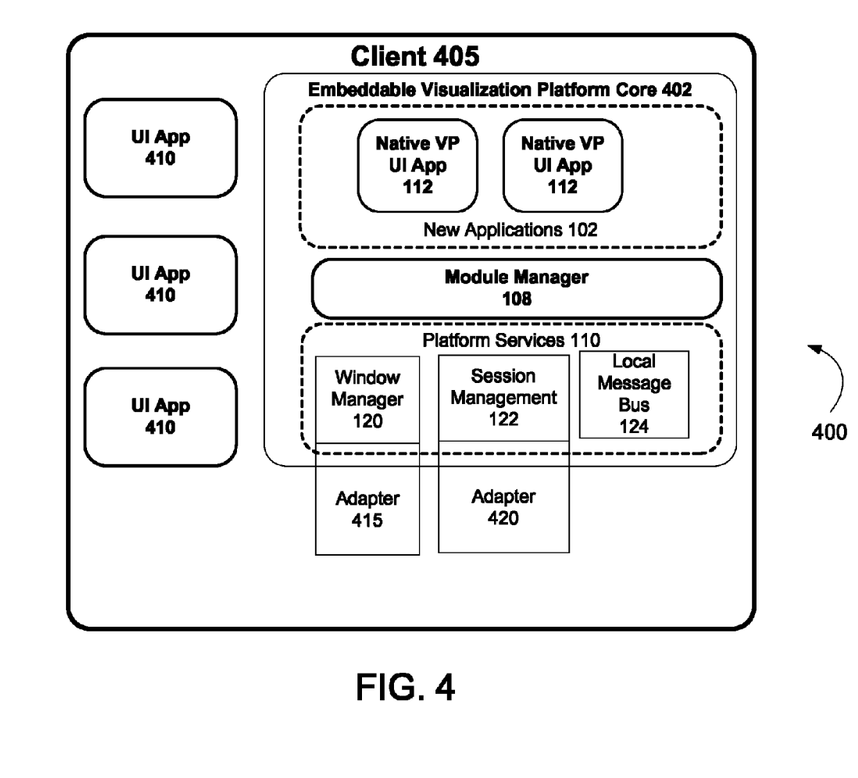
FIG. 4 illustrates an example system for providing an embedded service-oriented user interface integration bus according to one embodiment of the invention.

Such an embodiment is illustrated in FIG. 4 at system 400. System 400 can be part of a legacy application module or a computer system client 405 having an embeddable visualization platform microkernel 402. Microkernel 402 can run along side existing legacy application modules 410 in a client 405, thereby allowing legacy application modules 410 to interact with new application modules 102 that may be designed and implemented as part of a service-oriented user integration bus for a host platform that is not interoperable with the legacy system. In other words, legacy application modules 410 and legacy systems like client 405 that may desire to include language and platform neutral components can do so through the use of embedded microkernel 402.

Microkernel 402 can be integrated in the client 405 via several platform mechanisms depending on the technology associated with the legacy system or application module. For example, in one embodiment, a Java client can embed application modules for the service-oriented user integration bus via the Java Native Interface. In another embodiment, a Microsoft client can embed application modules for the service-oriented user integration bus via one or more Microsoft based technologies like Component Object Model ("COM") and ActiveX.

In one embodiment, visualization platform microkernel 402 can be embedded in client 405 and adapted to interface with legacy application modules 410 through one or more adapters 415 and 420. Adapters 415 and 420 can provide basic services for the legacy system, such as windowing, session management, and inter application communication. Adapters 415 and 420 can be configured as part of microkernel 402 to provide native functionality to application modules 112 contained within microkernel 402 without modifying functionality or implementation of new application modules 102. In one embodiment, adapters 415 and 420 can transform the one or more platform services for the host platform into one or more platform services for the existing application modules 410 to provide interoperability. In another embodiment, adapters 415 and 420 can transform the one or more platform services for the host platform into one or more platform services for the client 405.

For example, window manager module 120 can be adapted via adapter 415 to enable native application modules 112 for the visualization platform 100 to be hosted inside the windowing system used by client 405. For instance, in one embodiment client 405 may be a Microsoft .NET client when the embedded microkernel 402 is a Java client. In this circumstance, adapter 415 can be associated with transforming the Java-based window service requests from window manager 120 into Microsoft .NET window service requests for the client 405. In other embodiments, such as those where client 405 may lack a windowing system, adapters 415 and/or 420 can be optional.

Figure 5:
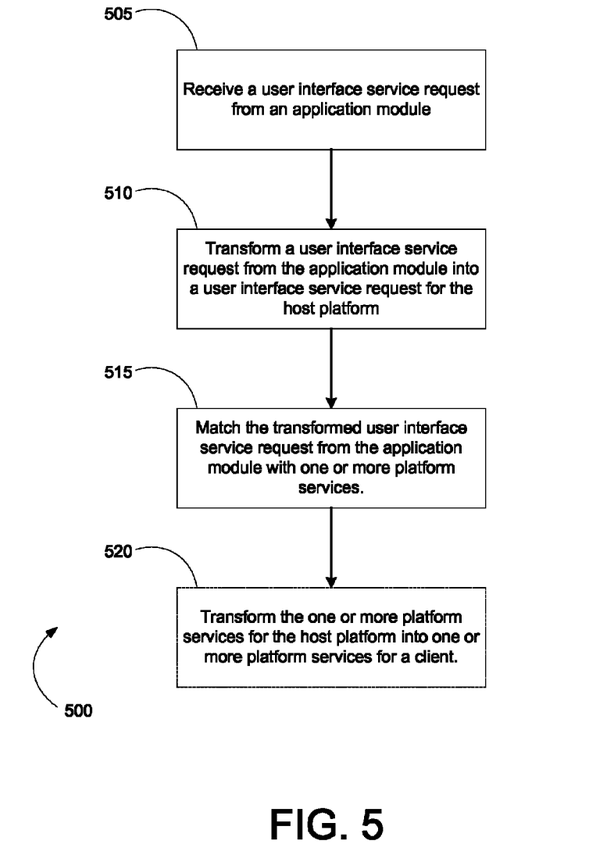
FIG. 5 illustrates an example method for providing a service-oriented user interface integration bus according to one embodiment of the invention.

FIG. 5 illustrates an example method 500 for providing a service-oriented user interface integration bus in accordance with one embodiment of the invention. As shown in FIG. 5, the method 500 begins in block 505, where a UI service request is received from an application module. The UI service request can be received from an application module associated with a first platform. In one embodiment, the first platform can share a common application framework with a host platform. For example and with reference to FIG. 1, a UI service request can be received from a new application module 102 such as native visualization platform application module 112, which can be integrated and/or designed to operate on the platform hosting visualization platform 100. A UI service request from a new application module 102 can be received by the module manager 108 or in other embodiments received directly by one or more platform services 110.

In another embodiment, the UI service request can be received from an application module associated with a first platform having an application framework different from the host platform. For example, in one embodiment, the UI service request can be received from an application module associated with a platform adapted to operate with a Microsoft .NET application framework, such as application module 114 in visualization platform 100. In another embodiment, the application module can be associated with a platform adapted to operate with a Java application framework, such as application module 116 in visualization platform 100. In another embodiment, the application module can be associated with a web-based and/or internet browser platform, such as application module 118 in visualization platform 100. In still other embodiments, any one or more of the embodiments above could be used.

It will be appreciated that as application modules can be associated with platforms different from the host platform, application modules can also be declarative or have declarative features. In other words, in some embodiments, one or more aspects of the application modules need not be associated with any particular platform or application framework, meaning that such application modules can have technologically independent features. In still other embodiments, application modules can be associated with the application framework of the host platform.

Method 500 continues at block 510, where a UI service request from an application module can be transformed into a UI service request for the host platform. For example and with reference to visualization platform 100, a UI service request from application module 114 can be received by platform adapter 126 and transformed into a UI service request for the platform hosting visualization platform 100. In one embodiment, the application module and platform adapter can be associated with a Microsoft .NET application framework as are platform adapter 126 and application module 114. In another embodiment, the application module and platform adapter can be associated with a Java application framework like platform adapter 128 and application module 116. In another embodiment, the application module and platform adapter can be associated with a web-based application framework like platform adapter 130 and application module 118. In other embodiments, any combination of the above could be used and/or combined with additional application frameworks.

At block 515, method 500 can continue where the transformed UI service requests from the application module can be matched with one or more platform services. In one embodiment, platform services can be associated with a host platform and the matching of services can provide a visual interface to a user, such as a graphical user interface, via the host platform. For example, and with reference to visualization platform 100, a transformed UI service request can be received by module manager 108 and matched by module manager 108 to one or more UI services available through platform services 110. In other embodiments, platform services can be associated with other application modules and the matching of services can be associated with facilitating communication between one or more UI application modules, such as application modules 112, 114, 116, and 118 illustrated as part of visualization platform 100 in FIG. 1. In other embodiments, any combination of the above could be provided.

In some embodiments, such as those embodiments that can be embedded in a legacy platform, application module, and/or thin or thick client rather than implemented on a host platform, method 500 can continue at block 520 where the one or more platform services for the host platform can be further transformed into one or more platform services for the legacy platform, application module, and/or client. For example, and with reference to FIG. 4, adapters 415 and 420 can be adapted to transform the one or more platform services for the host platform into one or more platform services for the existing application modules 410 to provide interoperability. In another embodiment, adapters 415 and 420 can transform the one or more platform services for the host platform into one or more platform services for the client 405. In other embodiments, any combination of the above could be used.

It will be appreciated that embodiments of the invention can be technology independent and can allow different types of UI application modules to run in an integrated manner. For example, application modules implemented and designed for a thick client can operate in tandem with a web thin client in the same UI environment using one or more of the application modules and/or components described above. Hence, while the invention is described above with reference to block and flow diagrams of systems, methods, apparatuses, and/or computer program products, these references are provided only as example embodiments of the invention.

In addition, blocks of the block diagrams and flow diagrams support combinations of means for performing the specified functions, combinations of elements or steps for performing the specified functions and program instruction means for performing the specified functions. Some blocks of the block diagrams and flow diagrams may not necessarily need to be performed in the order presented, or may not necessarily need to be performed at all, according to some embodiments of the invention.

It will be understood that each block of the block diagrams and flow diagrams, and combinations of blocks in the block diagrams and flow diagrams, can be implemented by special purpose hardware-based computer systems that perform the specified functions or elements, or combinations of special purpose hardware and computer instructions. These embodiments also may be practiced with other computer system configurations, including hand-held devices, multiprocessor systems, microprocessor based or programmable consumer electronics, mini-computers, mainframe computers, etc.

Certain embodiments of the invention may also be implemented through an application program running on an operating system of a computer. In addition, or in the alternative, the application program (in whole or in part) may be located in remote memory or in storage to allow for the practice of certain embodiments of the invention where tasks are performed by remote processing devices linked through a communications network.

It will also be understood that one or more blocks of the block diagrams and flow diagrams, and combinations of blocks in the block diagrams and flow diagrams, respectively, can be implemented by computer-executable program instructions. When implementing embodiments of the invention by computer-executable instructions, the computer program instructions may be loaded onto a general purpose computer, special purpose computer, or other programmable data processing apparatus to produce a machine, such that the instructions which execute on the computer or other programmable data processing apparatus create means for implementing the functionality of each block of the block diagrams, or combinations of blocks in the block diagrams discussed herein. These computer program instructions may also be stored in a computer-readable memory that can direct a computer or other programmable data processing apparatus to function in a particular manner—including implementing the functions specified in the block or blocks—such that the instructions stored in the computer-readable memory produce an article of manufacture. This article of manufacture can include instruction means for implementing one or more functions specified in the flow diagram block or blocks.

Many modifications and other embodiments of the invention set forth herein will be apparent having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

The claimed invention is:

1. A method for providing a service-oriented user interface integration bus on a host platform, the method comprising:
   receiving, by one or more platform adapters, one or more user interface service requests from at least one application module, wherein the at least one application module is associated with a first platform, the one or more interface service requests being described declaratively without regard to implementation features on a host platform;
   determining whether the at least one application module and the host platform share a common application platform;
   based on the determination, selectively identifying appropriate one or more platform adapters between the at least one application module and the host platform;
   selectively loading the one or more platform adapters;
   selectively transforming, through the one or more platform adapters, the one or more user interface service requests from the at least one application module into one or more user interface service requests for the host platform, wherein the transformation is based on the declarative descriptions corresponding to the implementation features associated with the host platform and wherein the at least one application module is bridged to the host platform through at least one module manager;

matching the one or more transformed user interface service requests from the at least one application module with one or more platform services available from the host platform, the one or more platform services configured to provide a visual interface with the at least one application module to a user on the host platform; and providing the visual interface with the at least one application module through the host platform.

2. The method of claim 1, wherein the first platform and the host platform are adapted to operate with a common application framework.

3. The method of claim 1, wherein the first platform is associated with a platform adapted to operate with a Java application framework.

4. The method of claim 1, wherein the first platform is associated with a platform adapted to operate with a Microsoft.NET application framework.

5. The method of claim 1, wherein the first platform is associated with a platform adapted to operate with a web-based application framework.

6. The method of claim 1, wherein at least one application module comprises a declarative application module, and the method further comprises:

receiving one or more user interface service requests from the declarative application module;

transforming the one or more user interface service requests from the declarative application module into one or more user interface service requests for the host platform; and matching the one or more transformed user interface service requests from the declarative application module with one or more platform services to provide a visual interface with the declarative application module to a user on the host platform.

7. The method of claim 6, wherein the one or more user interface service requests from the declarative application module are defined in a web services description language.

8. The method of claim 1, wherein the at least one application module associated with at least one of the following: a Java application framework, a Microsoft.NET application framework, and a web-based application framework.

9. A system comprising:

at least one memory for storing data and computer-executable instructions;

at least one computer interface; and at least one processor in communication with the at least one computer interface and configured to access the at least one memory, and further configured to execute the computer-executable instructions to:

receive, by one or more platform adapters, one or more user interface service requests from at least one application module, wherein the at least one application module is associated with a first platform, the one or more interface service requests being described declaratively without regard to implementation features on a host platform;

determine whether the at least one application module and the host platform share a common application platform;

based on the determination, selectively identify appropriate one or more platform adapters between the at least one application module and the host platform;

selectively load the one or more platform adapters;

selectively transform, through the one or more platform adapters, the one or more user interface service requests from the at least one application module into one or more user interface service requests for the host platform, wherein the transformation is based on the declarative descriptions corresponding to the implementation features associated with the host platform and wherein the at least one application module is bridged to the host platform through at least one module manager;

match the one or more transformed user interface service requests from the at least one application module with one or more platform services available from the host platform, the one or more platform services configured to provide a visual interface with the at least one application module to a user on the host platform; and provide the visual interface with the at least one application module through the host platform.

10. The system of claim 9, wherein the first platform and the host platform are adapted to operate with a common application framework.

11. The system of claim 9, wherein the first platform is associated with a platform adapted to operate with a Java application framework.

12. The system of claim 9, wherein the first platform is associated with a platform adapted to operate with a Microsoft.NET application framework.

13. The system of claim 9, wherein the first platform is associated with a platform adapted to operate with a web-based application framework.

14. The system of claim 9, wherein at least one application module comprises a declarative application module, and the at least one processor is configured to execute computer-executable instructions to:

receive one or more user interface service requests from the declarative application module;

transform the one or more user interface service requests from the declarative application module into one or more user interface service requests for the host platform; and match the one or more transformed user interface service requests from the at declarative application module with one or more platform services available from the host platform, the one or more platform services configured to provide a visual interface with the declarative application module to a user on the host platform.

15. The system of claim 14, wherein the declarative application module is configured to define the one or more user interface service requests in the web services description language.

16. The system of claim 9, wherein the visual interface is a graphical user interface.

17. The system of claim 9, wherein the at least one application module associated with the first platform is associated with at least one of the following: a Java application framework, a Microsoft.NET application framework, and a web-based application framework.

18. A computer program embodied on a computer-readable medium for providing a service-oriented user interface integration bus on a host platform, the computer program comprising instructions to:

receive, by one or more platform adapters, one or more user interface service requests from at least one application module, wherein the at least one application module is associated with a first platform, the one or more interface service requests being described declaratively without regard to implementation features on a host platform;

determine whether the at least one application module and the host platform share a common application platform;

based on the determination, selectively identify appropriate one or more platform adapters between the at least one application module and the host platform;

selectively load the one or more platform adapters;

selectively transform, through the one or more platform adapters, the one or more user interface service requests from the at least one application module into one or more user interface service requests for the host platform, wherein the transformation is based on the declarative descriptions corresponding to the implementation features associated with the host platform and wherein the at least one application module is bridged to the host platform through at least one module manager;

match the one or more transformed user interface service requests from the at least one application module with one or more platform services available from the host platform, the one or more platform services configured to provide a visual interface with the at least one application module to a user on the host platform; and provide the visual interface with the at least one application module through the host platform.

19. The computer program of claim 18, further comprising instructions to:

transform the one or more user interface service requests from the at least one application module into one or more user interface service requests for the host platform when the at least one application module is associated with at least one of the following: a Java application framework, a Microsoft.NET application framework, and a web-based application framework.

20. The computer program of claim 18, wherein the visual interface is a graphical user interface.

\* \* \* \* \*